(12) United States Patent
Mojem

(10) Patent No.: US 10,578,029 B2
(45) Date of Patent: Mar. 3, 2020

(54) ADJUSTMENT DEVICE FOR ADJUSTING SEVERAL GUIDE VANES OF AN ENGINE

(71) Applicant: Rolls-Royce Deutschland Ltd & Co KG, Blankenfelde-Mahlow (DE)

(72) Inventor: Mats Rudolf Mojem, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 147 days.

(21) Appl. No.: 15/842,076

(22) Filed: Dec. 14, 2017

(65) Prior Publication Data

US 2018/0171878 A1 Jun. 21, 2018

(30) Foreign Application Priority Data

Dec. 19, 2016 (DE) .......................... 10 2016 225 482

(51) Int. Cl.
*F02C 9/22* (2006.01)
*F01D 17/16* (2006.01)
(Continued)

(52) U.S. Cl.
CPC .............. *F02C 9/22* (2013.01); *F01D 17/162* (2013.01); *F16C 3/12* (2013.01); *F16C 3/28* (2013.01);
(Continued)

(58) Field of Classification Search
CPC .......... F02C 9/22; F01D 17/162; F01D 17/00; F01D 17/10; F01D 17/12; F01D 17/14;
(Continued)

(56) References Cited

U.S. PATENT DOCUMENTS

| 2,165,460 A | 7/1939 | Desing |
| 3,873,230 A * | 3/1975 | Norris ..................... F01D 17/16 415/162 |

(Continued)

FOREIGN PATENT DOCUMENTS

| EP | 0506415 A2 | 9/1992 |
| EP | 2136036 A1 | 12/2009 |

(Continued)

OTHER PUBLICATIONS

European Search Report dated Apr. 23, 2018 for counterpart European Patent Application No. 17206711.8.
(Continued)

*Primary Examiner* — Nathaniel E Wiehe
*Assistant Examiner* — Latoia L Sudler
(74) *Attorney, Agent, or Firm* — Shuttleworth & Ingersoll, PLC; Timothy J. Klima

(57) ABSTRACT

An adjustment device for adjusting several guide vanes of the engine, wherein the adjustment device includes at least one adjusting element that couples with the guide vanes and is mounted in an adjustable manner, a connection element that couples with the adjusting element, as well as a crank shaft for controlling an adjusting movement of the adjusting element, and the crank shaft has at least one coupling element which couples with the connection element and at which the connection element is hinged to transform a rotational movement of the crank shaft about a longitudinal axis of the crank shaft into an adjusting movement of the adjusting element for adjusting the guide vanes. The crank shaft has a modular design with at least two shaft modules that are arranged behind each other along the longitudinal axis of the crank shaft.

14 Claims, 10 Drawing Sheets

(51) Int. Cl.
  *F16C 3/12* (2006.01)
  *F16C 3/28* (2006.01)
  *F16C 17/02* (2006.01)
  *F16C 17/18* (2006.01)

(52) U.S. Cl.
  CPC ........ *F05D 2230/644* (2013.01); *F16C 17/02* (2013.01); *F16C 17/18* (2013.01); *F16C 2360/23* (2013.01); *F16C 2361/61* (2013.01)

(58) Field of Classification Search
  CPC .. F01D 17/16; F01D 17/20; F16C 3/12; F16C 3/28; F16C 2360/23; F16C 2361/61; F16C 17/02; F16C 17/18; F05D 2230/644; F04D 29/524; F04D 29/56; F04D 29/563; F04D 27/002; F04D 27/005; F04D 27/0246; F04D 27/0269
  USPC ......................................................... 415/150
  See application file for complete search history.

(56) References Cited

U.S. PATENT DOCUMENTS

| | | | | |
|---|---|---|---|---|
| 4,351,201 A | * | 9/1982 | Link | F16C 3/12 403/393 |
| 6,457,937 B1 | | 10/2002 | Mashey | |
| 6,769,868 B2 | * | 8/2004 | Harrold | F01D 17/162 415/150 |
| 8,435,000 B2 | * | 5/2013 | Wong | F01D 17/162 415/160 |
| 8,784,043 B2 | * | 7/2014 | Bouru | F04D 29/563 415/160 |
| 8,826,873 B2 | * | 9/2014 | Landersdorfer | F01L 1/053 123/90.17 |
| 9,188,138 B2 | * | 11/2015 | Keegan | F01D 17/162 |
| 9,797,265 B2 | * | 10/2017 | Soehner | F01D 9/00 |
| 10,077,799 B2 | * | 9/2018 | Wilhelm | F16C 3/12 |
| 2009/0318238 A1 | | 12/2009 | Bolgar et al. | |
| 2012/0134783 A1 | * | 5/2012 | Davidson | F04D 27/0246 415/148 |
| 2014/0064912 A1 | * | 3/2014 | Velampati | F01D 17/162 415/1 |
| 2014/0133968 A1 | | 5/2014 | Holchin et al. | |
| 2018/0223685 A1 | * | 8/2018 | Bromann | F01D 17/162 |
| 2019/0024531 A1 | * | 1/2019 | Littler | F01D 17/162 |

FOREIGN PATENT DOCUMENTS

| | | |
|---|---|---|
| EP | 2703606 A1 | 3/2014 |
| EP | 2949878 A1 | 12/2015 |
| WO | WO2014133724 A1 | 9/2014 |
| WO | WO2015088936 A1 | 6/2015 |

OTHER PUBLICATIONS

German Search Report dated Dec. 19, 2016 for counterpart German Application No. 10 2016 225 482.0.

European Search Report dated Jun. 18, 2019 for counterpart European Patent Application No. 19168230.1.

* cited by examiner

ADJUSTMENT DEVICE FOR ADJUSTING SEVERAL GUIDE VANES OF AN ENGINE

REFERENCE TO RELATED APPLICATION

This application claims priority to German Patent Application No. 10 2016 225 482.0, filed on Dec. 19, 2016, the entirety of which is incorporated by reference herein.

BACKGROUND

The invention relates to an adjustment device for adjusting several guide vanes of an engine.

In engines, for example turbomachines and in particular gas turbine engines, it is generally known to provide adjustable guide vanes for influencing the flow depending on the rotational speed of rotating rotor blades. In particular in gas turbine engines, usually adjustable guide vanes are used in the area of the compressor, wherein the guide vanes are adjusted depending on the compressor's rotational speed. In the technical jargon, the adjustable guide vanes are referred to as variable stator vanes, or VSV, in short.

Here, the adjustable guide vanes usually represent a component of a guide vane row and are arranged inside a housing in which the rotating rotor blades are also arranged. In practice, the individual guide vanes are mounted at the housing so as to be respectively adjustable via a bearing journal. Provided inside the housing is usually a rotatable bearing of a guide vane at a hub, e.g. of a compressor. Each bearing journal is mounted in a rotatable manner at the housing inside an associated bearing opening in the wall of the housing. At that, the bearing journal passes through this bearing opening along an extension direction of the bearing journal, so that an end of the bearing journal is accessible at an outer side of the housing for adjusting the corresponding guide vane by turning the bearing journal. At that, usually respectively one lever, which is fixated at an adjusting element in the form of an adjusting ring of an adjusting mechanism, engages at a journal end to simultaneously adjust several guide vanes by adjusting the adjusting element and multiple levers that are hinged thereat. Such a generic guide vane assembly with adjustable guide vanes for a compressor of a gas turbine engine is shown EP 2 949 878 A1, for example. In practice, the bearing journals of the guide vanes, which are often also referred to as shingles, are provided in radially protruding sleeve-shaped bearing extensions of the housing. These bearing extensions are formed at a wall of the housing and ensure the rotatable mounting and support of the bearing journal.

The at least one adjusting element of the adjustment device provided for adjusting the guide vanes is usually supported at an outer side of the housing, and is adjustable relative to the same in the circumferential direction so as to cause a rotation of the guide vanes about their respective rotational axis. The adjusting element is coupled to a connection element of the adjustment device, for example connected to the same in a hinged manner, with the connection element of the adjustment device in turn being additionally connected to a crank shaft of the adjustment device. This crank shaft is configured and provided for controlling an adjusting movement of the adjusting element, and can be rotated for that purpose about a longitudinal axis of the crank shaft by means of an actuator. The crank shaft has at least one coupling element which is coupled to the connection element and at which the connection element is hinged in order to transform a rotational movement of the crank shaft into an adjusting movement of the adjusting element for adjusting the guide vanes.

Here, the crank shaft usually has several coupling elements that are arranged at a distance to each other along the longitudinal axis, with respectively one connection element for an associated adjusting element being hinged thereat. In this way, several adjusting elements can be synchronously adjusted by means of the rotation of the crank shaft, and thus guide vanes of several guide vane rows can be adjusted. At that, it is determined through the position of the individual coupling elements as to what adjustment track the respectively associated adjusting element, which is coupled via a connection element, covers when the crank shaft is rotated by a defined rotational angle. In this context, it is also often important at what radial distance to the centrally extending longitudinal axis of the crank shaft the respective connection element is hinged at its associated coupling element. The arrangement of the individual coupling elements and in particular their radial position ultimately influences the possible adjustment of the guide vanes, and in particular the degree of the adjustment of the guide vanes of different guide vane rows, which have to be coordinated with each other. If the optimal position and relative position of the individual coupling elements is known, a single-piece crank shaft at which the individual coupling elements are formed is usually used. However, here an adjustment of the possible adjustment tracks is no longer possible, or is possible only to a very limited degree.

In particular to be able to still variably adjust components of the crank shaft during the development phase of the engine and in particular to be able to vary the radial position of individual coupling elements for adjusting an adjusting element in the form of an adjusting ring for a guide vane row, what is for example suggested in EP 2 949 878 A1 is to fixate the individual coupling elements, which are preferably embodied with fork heads, at a solid shaft by means of a spline connection, so that the radial position of these coupling elements can be changed. It is also provided that the coupling element can be fixated at the solid shaft at an axial end of the crank shaft in different rotational positions. What is suggested for this purpose are two bolted connections through two threaded bolts, wherein one of the bolted connections can be realized by means of different bolt openings that are arranged next to each other along a circular line about the longitudinal axis.

While in this way the adjustment device as it is known from the state of the art already offers a certain degree of flexibility when it comes to setting the crank shaft for the adjusting movement of the adjusting element that is to be obtained, the modification of a transmission ratio and also the range of the adjusting options of the coupling elements in the radial direction are limited in the adjustment device of EP 2 949 878 A1.

SUMMARY

Therefore, it is the objective of the invention to provide an adjustment device that is improved in this regard to be able to realize different coordinated adjustments of the guide vanes via the crank shaft in a comparatively simple manner in particular in a development phase.

This objective is achieved by means of an adjustment device with features as described herein.

What is consequently proposed according to a first aspect of the invention is an adjustment device for adjusting several guide vanes of an engine, in which the crank shaft of the adjustment device is constructed in a modular manner with at least two shaft modules that are arranged behind each other along the longitudinal axis of the crank shaft and can be fixated in different rotational positions about the longitudinal axis of the crank shaft relative to each other by means of at least one toothing. The crank shaft further has a coupling element that is provided at one of the at least two shaft modules. The coupling element is coupled to a connection element, which is in turn coupled to an adjusting element for adjusting the guide vanes, for example an adjusting ring that extends along the circumference of a housing at which the guide vanes are mounted in an adjustable manner.

The invention is based on the basic idea of providing at least two adjoining shaft modules of the crank shaft that are fixated relative to each other by means of at least one toothing when the adjustment device and in particular the crank shaft is mounted according to the intended use. To be able to realize different transmission ratios and adjustments of the guide vanes via the crank shaft without having to use a new crank shaft, the at least two shaft modules can be detached from each other, and can then be rotated relative to each other until the crank shaft is mounted again according to the intended use.

What is understood here by a 'toothing' of the at least two shaft modules with each other is a form-fit connection by means of meshings of alternatingly projecting sections, so that the shaft modules are fixedly attached to each other in a torque-proof manner. These meshing sections can project axially and/or radially and/or be embodied in a prong-like or web-like manner.

To keep the at least two shaft modules in mesh with each other through their toothing when the crank shaft is mounted according to the intended use, a tension rod can for example be provided that extends along the longitudinal axis. In that case, the at least two shaft modules are axially pre-stressed against each other by means of this tension rod, wherein the tension rod extends with a shaft through passage openings of the shaft modules. At a first axial end, the tension rod can have a head that abuts at a front face of a first end-side shaft module. In one embodiment variant, a nut is screwed on at a second axial end of the tension rod, abutting at a front face of a second end-side shaft module to axially pre-stress the shaft modules that are arranged behind each other along the longitudinal axis of the tension rod against each other, and to fixedly attach them at each other in a torque-proof manner by means of the respective toothing.

In principle, the crank shaft can have only one individual coupling element for coupling to a connection element, which may for example be hinged at a coupling element. However, in one embodiment variant the adjustment device has at least one further adjusting element, for example for a further guide vane row that is arranged at an axial distance, as well as at least one further connection element that is coupled with this further adjusting element. In that case, a further coupling element is provided at the crank shaft for this further connection element at which the further connection element is hinged and which is positioned at another shaft module of the crank shaft. Particularly by fixating these two shaft modules at each other in a releasable manner by means of at least one toothing, especially their relative position with respect to each other, e.g. in a demounted state of the crank shaft, can be easily modified in this variant.

In one embodiment variant, at least one intermediate piece is provided for fixating the shaft modules at each other in a mounted state of the crank shaft. Via this intermediate piece, at least two (adjoining) shaft modules are fixated relative to each other in a rotational position about the longitudinal axis of the crank shaft. For this purpose the intermediate piece meshes with a first toothing of the one shaft module and with a second toothing of the other shaft module. For example, it can be provided in this context that the intermediate piece has an outer toothing, and respectively meshes with an inner toothing of the two shaft modules.

In a possible further development based hereon, the intermediate piece is embodied as a gear wheel ring. Such a gear wheel ring has an outer toothing that is continuous or, where necessary, interrupted along the circumferential direction either once or multiple times, and meshes with a circumferential inner toothing of the one shaft module, on the one hand, and with a circumferential inner toothing of the other shaft module, on the other. Here, the two inner toothings are provided at front faces of the two shaft modules, which are positioned opposite each other in the mounted state of the crank shaft according to the intended use. In this manner, the two shaft modules are connected to each other in a torque-proof manner via the toothed intermediate piece, for example in the form of the gear wheel ring that meshes with both inner toothings, and are fixated relative to each other.

Alternatively or additionally, at least two shaft modules of the crank shaft can be fixated relative to each other via a Hirth toothing in a rotational position about the longitudinal axis of the crank shaft. While in the above-described variant with an externally toothed intermediate piece the toothing is provided at the circumferential side, what is provided in a Hirth toothing of two shaft modules is an axially effective fixation via prong-shaped projections that mesh alternatingly in the axial direction (with respect to the longitudinal axis of the crank shaft). Of course, it is not excluded in this context that individual shaft modules of the crank shaft are fixated at each other by means of an externally toothed intermediate piece, and other shaft modules are fixated at each other by means of a Hirth toothing. Besides, an axial pre-stress of the individual shaft modules can also be applied in this variant, for example by means of a tension rod that extends along the longitudinal axis.

In an exemplary embodiment, at least two different types of shaft modules that are fixated at each other and that can be fixated in different rotational positions with respect to each other are provided at the crank shaft. A first type of shaft module can have a coupling element that is provided thereat and, where necessary, is radially adjustable, while a second type of shaft module does not have a coupling element and serves for mounting the crank shaft in a rotatable manner. In that case, the second type of shaft module can for example be mounted in a rotatable manner at least at one bearing block provided at an outer shell surface of a housing at which the rotor blades are mounted in an adjustable manner.

In an exemplary embodiment, the coupling element is arranged at a shaft module so as to be radially adjustable between at least two adjusting positions with respect to the longitudinal axis, and can be fixated in each of the adjusting positions. In other words, what is provided in this variant is not only the possibility of adjusting complete shaft modules in their rotational position relative to each other, but additionally also to modify a coupling element's radial position, and thus its length with which it radially projects with respect to the longitudinal axis of the crank shaft.

For example, the coupling element can be arranged at the crank shaft so as to be radially adjustable between at least two adjusting positions with respect to the longitudinal axis, and can be fixated in each of the adjusting positions by means of at least one toothing. Through the fixation by means of a toothing, an adjusting position of the coupling element is effectively secured in a form-fit manner. At the same time, an adjustability of the coupling element in defined steps is ensured through the toothing. In particular, such an adjustability of a coupling element [of a] crank shaft is also independent of a modular design of the crank shaft with at least two shaft modules which can be fixated relative to each other by means of at least one toothing.

Accordingly, what is proposed according to a further aspect of the invention is an adjustment device in which at least one coupling element of a crank shaft is arranged at the crank shaft so as to be radially adjustable between at least two adjusting positions with respect to the longitudinal axis, and can be fixated in each of the adjusting positions by means of at least one toothing. However, these two aspects can of course be radially combined with each other, so that the advantages of a form-fit and easily realizable connection by means of a toothing can be used in an adjustment device for fixating the two shaft modules of the crank shaft, as well as for fixating a coupling element at a shaft module.

In a coupling element that can be fixated in different radial adjusting positions via a toothing, the toothing also extends radially in one embodiment variant, and can for example be embodied at a fastening body of the coupling element. In that case, such a fastening body has at least one toothed toothing surface for fixating in the possible adjusting positions.

In this context, it may for example be provided in a further development that two toothed toothing surfaces are provided at the fastening body of the coupling element, in particular that they are embodied thereat, and namely at the front faces of the fastening body that are facing away from each other (along the longitudinal axis of the crank shaft). In this variant, the fastening body thus has toothing surfaces at the axial front faces that are brought into mesh with (counterpart) toothing surfaces at the crank shaft, in particular a shaft module, when the crank shaft is mounted according to the intended use, so as to fixate the respective coupling element in a radially immobile manner.

In an exemplary embodiment, to obtain a compact embodiment of the crank shaft, the fastening body is received at least partially inside a recess in which a toothed (counterpart) toothing surface is provided at least at one of its inner walls, acting together with the toothing surface of the fastening body. Here, a secure locking of the coupling element in the mounted state of the crank shaft is obtained through the meshing of the toothing surfaces of the fastening body, on the one hand, and the recess, on the other.

In an exemplary embodiment, the modular crank shaft is equipped with at least one radially adjustable coupling element that can be fixated by means of at least one toothing. As has already been explained above, the at least two shaft modules can be axially pre-stressed against each other by means of a tension rod extending along the longitudinal axis. In that case, in an exemplary embodiment, the fastening body of the coupling element forming the at least one toothed toothing surface has a radially extending passage opening with a hole-like design through which the tension rod extends and is radially adjustable via the fastening body with respect to the tension rod if an axial pre-stress of the shaft modules is reduced or eliminated. A reduction or elimination of the pre-stress applied via the tension rod may for example be necessary for mounting purposes and/or for the modification of a transmission ratio between the rotational angle of the crank shaft and the adjustment track of the adjusting element. At that, a coupling element can be radially adjusted even without completely removing the tension rod from the shaft modules of the crank shaft. The coupling element is held in a radially adjustable manner at the respective shaft module due to the respective fastening body having a corresponding degree of freedom across the radially extending passage opening when the axial pre-stress of the individual shaft modules applied via the tension rod is reduced so far that the toothing surfaces of the fastening body, on the one hand, and at a shaft module, on the other, are also no longer held in mesh with other ones.

For (additional) fixation of a per se radially adjustable coupling element, a longitudinally extending attachment element, such as a screw or a bolt, is provided in an exemplary embodiment, extending substantially perpendicular to the longitudinal axis of the crank shaft and in that case also applying a holding force to the coupling element substantially perpendicular to the longitudinal axis in order to secure the coupling element in an occupied radial adjusting position.

In principle, the coupling element can have a fork head for being coupled to the connection element. The connection element can for example be a connecting rod that is hinged at the fork head, on the one hand, and at an adjusting ring of the adjustment device, on the other. At that, the adjusting ring is coupled to several guide vanes in such a manner that several guide vanes are synchronously adjusted via the rotational movement of the crank shaft and the resulting adjusting movement of the adjusting ring along a circumferential direction.

BRIEF DESCRIPTION OF THE DRAWINGS

The attached Figures illustrate possible embodiment variants of the solution according to the invention by way of example.

DETAILED DESCRIPTION

Figure 6:
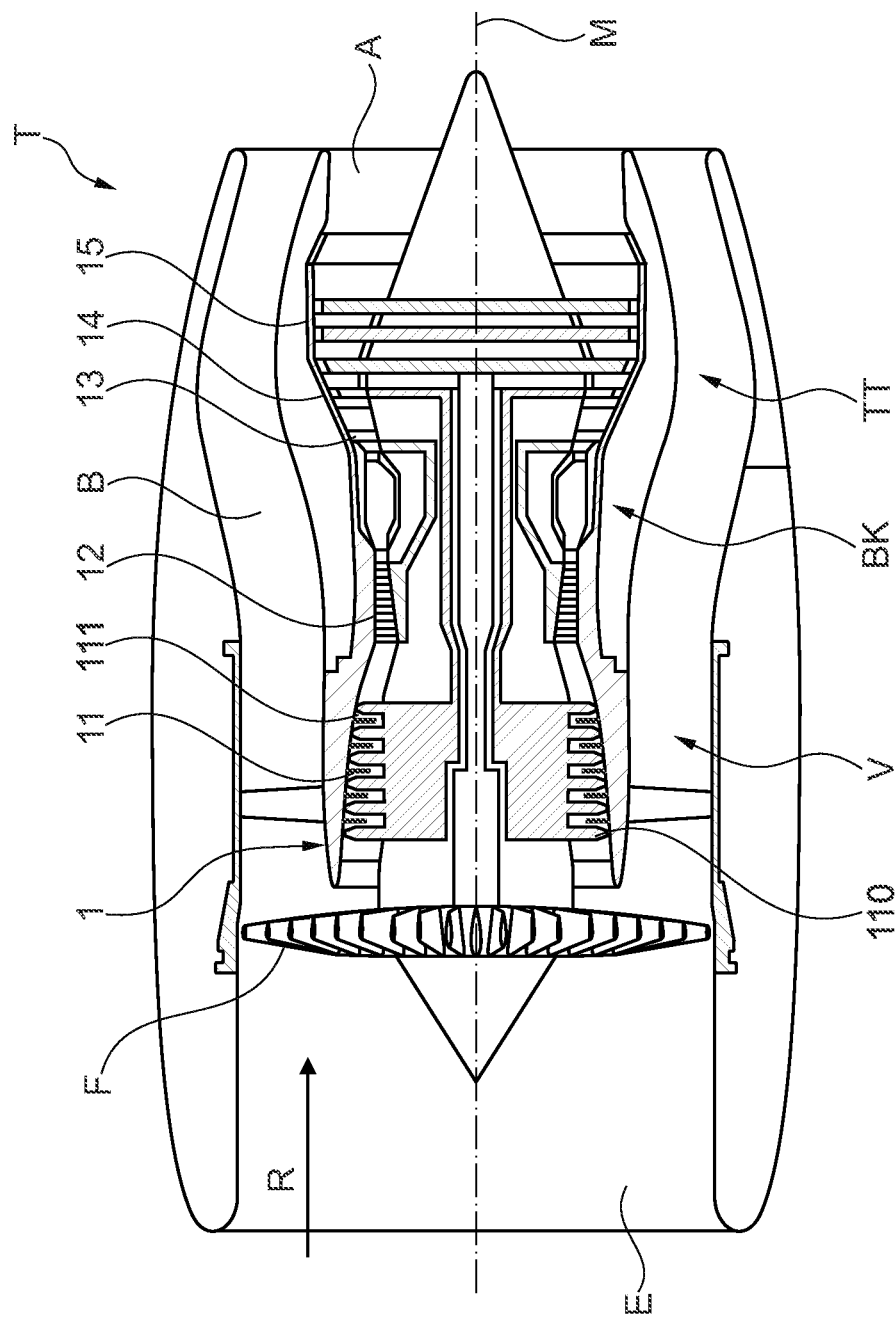
FIG. 6 shows, in sectional view and in a schematic manner, a gas turbine engine in which at least one guide vane assembly according to the invention is used.

FIG. 6 schematically illustrates, in a sectional rendering, a (gas) turbine engine T in which the individual engine components are arranged in succession along a central axis or rotational axis M. By means of a fan F, air is suctioned in along an entry direction E at an inlet or an intake E of the engine T. This fan F is driven via a shaft that is set into rotation by a turbine TT. Here, the turbine TT connects to a compressor V, which for example has a low-pressure compressor 11 and a high-pressure compressor 12, and where necessary also a medium-pressure compressor. The fan F supplies air to the compressor V, on the one hand, and, on the other hand, to a by-pass channel B for generating a thrust. The air that is conveyed via the compressor V is transported into a combustion chamber section BK where the driving power for driving the turbine TT is generated. For this purpose, the turbine TT has a high-pressure turbine 13, a medium-pressure turbine 14, and a low-pressure turbine 15. The turbine TT drives the fan F by means of the energy that is released during combustion in order to generate the necessary thrust by means of the air that is conveyed into the bypass channel B. The air is discharged from the bypass channel B in the area of an outlet A at the end of the engine T, where exhaust from the turbine TT flows outwards. Here, the outlet A usually has a thrust nozzle.

The compressor V comprises multiple rows of rotor blades 110 that are arranged behind each other in the radial direction, as well as rows of guide vanes 111 arranged in between them in the area of the low-pressure compressor 11. The rows of rotor blades 110 rotating about the central axis M and the rows of stationary guide vanes 111 are arranged alternatingly along the central axis M and accommodated inside a (compressor) housing 1 of the compressor V. The individual guide vanes 111 are mounted at the single-part or multi-part housing 1 in an adjustable manner—usually in addition to a radially inner bearing at the hub of the compressor V.

Figure 5A:
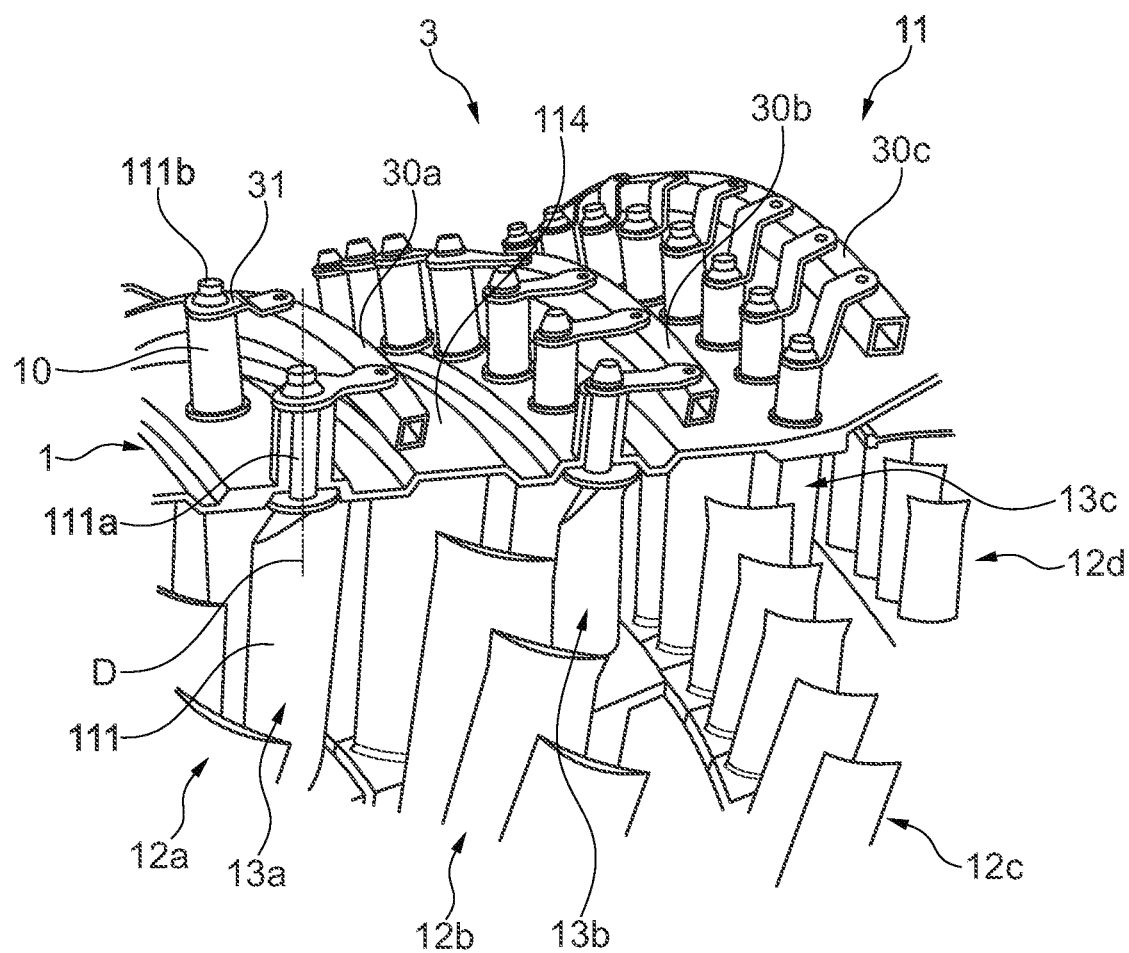
FIG. 5A shows, in sections and in a perspective view, an arrangement with several guide vane assemblies as it is known from the state of the art, with respectively one guide vane row and several rotor blade assemblies.

Here, FIG. 5A shows, in sections and in greater detail, an arrangement of rotor blade rows 12a to 12d and guide vane rows 13a to 13c for the low-pressure compressor 11 as known from the state of the art. The guide vanes 111 of the guide vane rows 13a, 13b and 13c that are arranged behind each other are mounted at the housing 1 in an adjustable manner so that the position of the guide vanes 111 can be changed depending on the compressor's rotational speed. For this purpose, a bearing journal 111a of each rotor blade 111 is mounted in a rotatable manner in a bearing opening that is embodied by a sleeve-shaped and radially outwardly protruding bearing extension 10 of the housing 1. Each bearing journal 111a is mounted and supported inside an associated bearing extension 10 so as to be rotatable about a rotational axis D. At that, each bearing journal 111a passes through an associated bearing extension 10, so that a journal end 111b projects from the bearing extension 10 at the outer side of the housing 1.

Thus, respectively one adjustment lever 31 of an (guide vane) adjustment device 3 can engage at the individual journal ends 111b to rotate the bearing journal 111a, and thus change the position of the associated guide vane 111. Here, the levers 31 of a guide vane row 13a, 13b or 13c are respectively hinged at an adjusting element in the form of an adjusting ring 30a, 30b or 30c of the adjustment device 3.

The adjusting ring 30a, 30b, 30c, which is often comprised of multiple parts and divided into at least two segments, extends at the circumferential side along the outer shell surface of the housing 1. Thus, by adjusting the adjusting ring 30a, 30b, 30c, the adjustment levers 31 hinged thereat as well as multiple, usually all, guide vanes 111 of a guide vane row 13a, 13b or 13c can be adjusted. At that, the individual adjusting rings 30a, 30b, 30c for the individual guide vane rows 13a, 13b and 13c are usually adjustable independently of each other. An adjusting ring 30a, 30b, 30c is supported at an outer side of the housing 1, for example at a contact surface 114 that extends at the circumferential side.

Figure 5B:
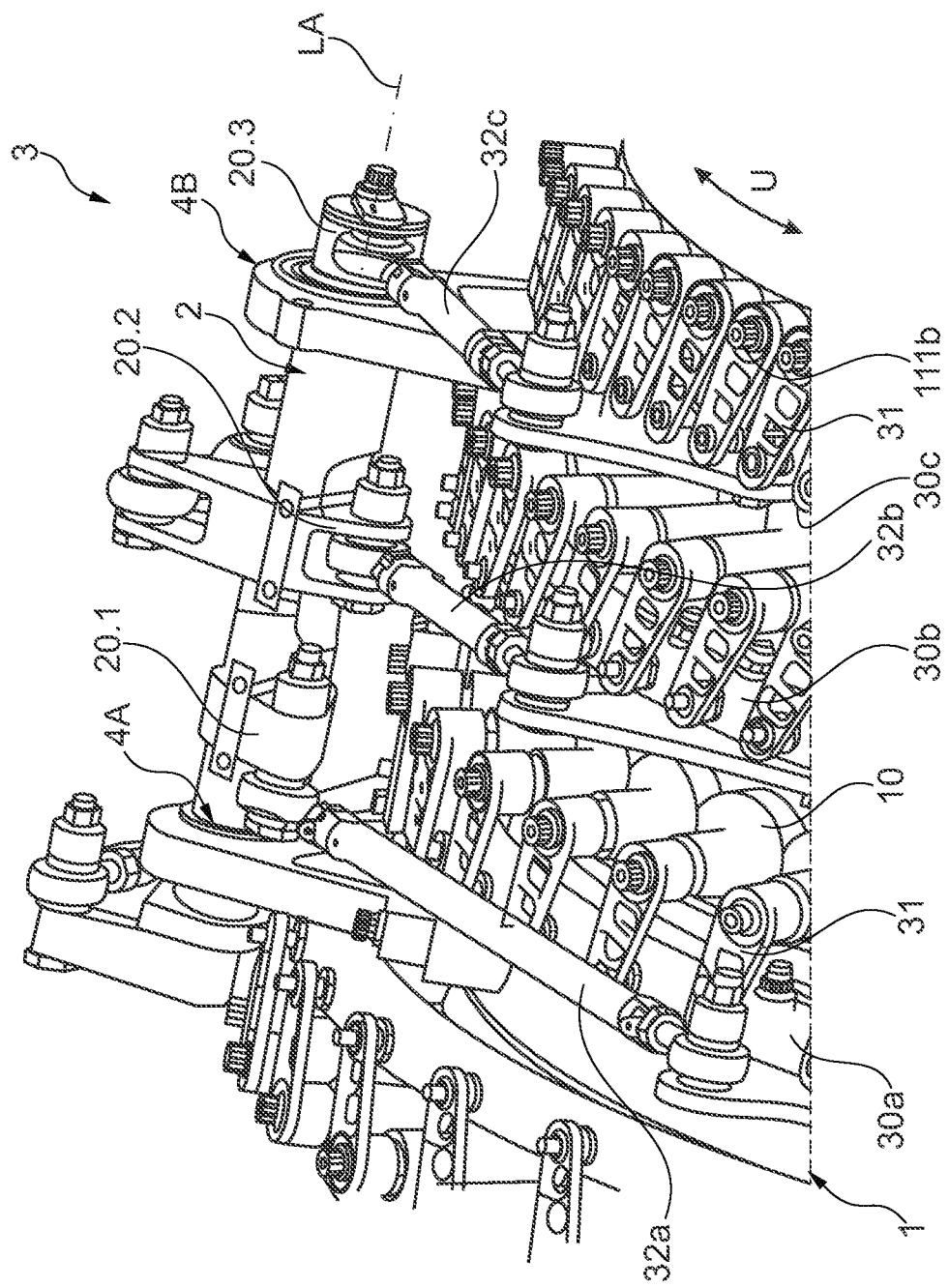
FIG. 5B shows, based on the arrangement of FIG. 5A, an adjustment device for adjusting guide vanes of several guide vane rows by means at least one rotatable crank shaft and several coupling elements provided thereat, as it is known from the state of the art.

Further, FIG. 5B shows, in sections and also in a perspective rendering, a more detailed illustration of an adjustment device 3 for adjusting the guide vanes 111 as it is known from the state of the art. Here, a crank shaft 2 for adjusting the individual adjusting rings 30a, 30b, 30c is shown in addition to the individual adjusting rings 30a, 30b, 30c for the individual rotor blade rows 13a, 13b, 13c. The crank shaft 2 is mounted at bearing blocks 4A, 4B at an outer shell surface of the housing 1 so as to be rotatable about the longitudinal axis LA. Further provided at the crank shaft 2 are several coupling elements 20.1, 20.2, 20.3 with respectively one fork head 201 at which a connection element in the form of a connecting rod 32a, 32b or 32c is hinged. Each connecting rod 32a, 32b and 32c is assigned to one of the adjusting rings 30a, 30b, 30c and connected to the same in an articulated manner. Thus, when the crank shaft 2 rotates, an adjustment force is transferred to the individual adjusting rings 30a to 30c to adjust them along the circumference in a circumferential direction U and to rotate the guide vanes 111 of the different guide vane rows 13a to 13c about their respective rotational axis D through the adjustment levers 31 that are connected to the respective adjusting rings 30a to 30c.

How strongly the individual guide vanes 111 of the different guide vane rows 13a to 13c are adjusted during rotation of the crank shaft 2 and in particular at which point in time and to what extent the individual guide vanes 111 of a guide vane row 13a to 13c are adjusted in relation to other guide vane rows 13a to 13c, significantly depends on the (angular) position of the individual coupling elements 20.1, 20.2 and 20.3 relative to each other, as well as on their radial position with respect to the longitudinal axis LA of the crank shaft 2. In the mounted state of the crank shaft 2 according to the intended use and during operation of the engine T, the positions of the coupling elements 20.1 to 20.3 are invariable and have been adjusted beforehand to the operational conditions of the engine T. However, especially during the development phase of the engine T, it is not uncommon that different transmission and adjustment ratios for adjusting the guide vanes 111 of the individual guide vane rows 13a to 13c are to be tested. For this purpose, it has turned out to be advantageous if the coupling elements 20.1 to 20.3 are embodied at the crank shaft 2 in an adjustable manner, so that the respective conditions may be varied also without exchanging the crank shaft 2. Here, it is provided that the coupling elements 20.1 to 20.3 can be adjusted radially with respect to the longitudinal axis LA of the crank shaft 2, for example according to the teaching of EP 2 949 878 A1 by means of a spline connection. However, here the radial adjustability of the individual coupling elements 20.1 to 20.3 is limited. Further, setting the rotational positions of the individual coupling elements 20.1 to 20.3 about the longitudinal axis LA relative to each other is also not possible. For this purpose, a completely new crank shaft 2 would usually have to be provided. The embodiment variants of an adjustment device 3 according to the invention of FIGS. 1A to 4 provide a solution particularly in this respect.

What is thus proposed is an adjustment device 3 with a crank shaft 2, which is shown in different views in FIGS. 1A to 10. This crank shaft 2 is constructed in a modular manner with several shaft modules 6.1, 6.2, 6.3, 6.4, 7A and 7B. At that, the rotation of the crank shaft 2 about its longitudinal axis LA is realized by means of an actuator, which is not shown in the present case. This actuator may for example engage in the area of a front or rear axial end of the crank shaft 2. In the present case, the crank shaft 2 comprises different types of shaft modules, namely (a) shaft modules 6.1 to 6.4 that are embodied as holder modules and respectively have a coupling element 20.1 to 20.4 with a fork head 201 for linking a connecting rod 23a to 23c, as well as (b) bearing modules 7A, 7B without a coupling element that are configured to provide a rotatable mounting of the crank shaft 2 at the [bearing blocks] 4A and 4B. For this purpose, the bearing modules 7A and 7B may for example be embodied in a tubular or sleeve-shaped manner and received in a rotatable manner at the respectively associated bearing block 7A or 7B.

Amongst each other, the individual shaft modules 6.1 to 6.4, 7A, 7B are fixated at each other by means of at least one toothing in the mounted state of the crank shaft 2 according to the intended use as it is shown in FIGS. 1A to 10. However, in principle the individual shaft modules 6.1 to 6.4, 7A, 7B can be fixated in different rotational positions relative to each other about the longitudinal axis LA, so that individual shaft modules 6.1 to 6.4, 7A, 7B can be aligned differently relative to each other, and can subsequently be fixated at each other and connected to each other in a torque-proof manner.

A tension rod 5 is provided for fixating the individual shaft modules 6.1 to 6.4, 7A and 7B arranged behind each other along the longitudinal axis LA relative to each other and to connect them to each other in a torque-proof manner. This tension rod 5 extends through corresponding passage openings 60H, 70H of the individual shaft modules 6.1 to 6.4, 7A, 7B. The individual shaft modules 6.1 to 6.4, 7A and 7B are axially pre-stressed against one another by means of a head 50 of the tension rod 5, which abuts a holder module 6.4 at a first axial end of the crank shaft 2, and a nut N that is screwed onto the tension rod 5 at the other axial end of the crank shaft 2. In the present case, the nut N acts on a bearing module 7A.

On the front-face side, each of the shaft modules 6.1 to 6.4, 7A, 7B has respectively one inner toothing 608A, 608B or 78 for the torque-proof toothing of the individual shaft modules 6.1 to 6.4, 7A and 7B amongst each other. Here, the face-side ends of the individual shaft modules 6.1 to 6.4, 7A, 7B respectively have a circular cross section, wherein the respective inner toothing 608A, 608B or 78 is embodied in a circumferential manner at an annular protruding edge at each front face of the respective shaft module 6.1 to 6.4, 7A, 7B. Respectively one externally toothed intermediate piece in the form of a gear wheel ring 8.1, 8.2, 8.3, 8.4 or 8.5, which is assigned to two shaft modules 7A/6.1, 6.1/6.2, 6.2/6.3, 6.3/7B or 7B/6.4, is provided for the torque-proof connection to an adjoining shaft module 6.1 to 6.4, 7A, 7B.

A likewise circumferential outer toothing 88 is embodied at an outer shell surface at each gear wheel ring 8.1 to 8.5. Respectively protruding in a ring-shaped manner, the internally toothed edges of each shaft module 6.1 to 6.4, 7A, 7B respectively project so far axially that the outer toothing 88 of a gear wheel ring 8.1 to 8.5 can be received between booth adjoining shaft modules and meshes with the inner toothings 608A/608B, 608B/78 or 78/608A of two adjoining shaft modules, so that they are thus connected to each other in a torque-proof manner when a sufficient axial pre-stress is applied to the shaft modules 6.1 to 6.4, 7A, 7B arranged along the longitudinal axis LA via the tension rod 5 and the nut N screwed thereto. At that, each of the intermediate pieces 8.1 to 8.5 has a passage opening 80H for the tension rod 5.

Through the toothings of the individual shaft modules 6.1 to 6.4, 7A, 7B, a highly stressable form-fit connection and fixation of the individual shaft modules 6.1 to 6.4, 7A, 7B to each other is achieved. At the same time, the individual shaft modules 6.1 to 6.4, 7A, 7B can also easily take different relative positions with respect to each other when an axial pre-stress is reduced or eliminated, and the individual shaft modules have been displaced along the longitudinal axis LA relative to each other, e.g. after the nut N has been screwed on.

As an additional adjusting possibility, each coupling element 20.1 to 20.4 is provided to be radially adjustable at the holder modules 6.1 to 6.4 of the crank shaft 2. As illustrated by way of example for a holder module 6.3 with a coupling element 20.3 based on FIGS. 2A to 2C and 3, for this purpose each holder module 6.1 to 6.4 is provided with a centrally arranged recess 600, by means of which a carrier body 60 of each holder module 6.1 to 6.4 is divided into two (front and rear) module sections 60A and 60B. These two module sections 60A, 60B are connected to each other via an axially extending attachment section 61 having a circular-segment-shaped cross section. A part of each module section 60A, 60B is the respective internally toothed edge projecting at the front-face side for the torque-proof connection to the adjoining shaft module 6.1 to 6.4, 7A, 7B by means of the associated gear wheel ring 8.1 to 8.5.

Inner walls of the recess 600 that are positioned opposite each other along the longitudinal axis LA and are formed by both module sections 60A and 60B, respectively have a toothed toothing surface 601 or 602 on their entire surface, interrupted only by a part of the passage opening 60H for the tension rod 5. Respectively one toothed toothing surface 2001, 2002 of a fastening body 200 of the associated coupling element 20.1-20.4 can be brought into a form-fit mesh with these opposite toothing surfaces 601, 602 to fixate the respective coupling element 20.1 to 20.4 in a prescribed radial position.

When the crank shaft 2 is mounted according to the intended use, the fastening body 200 of each coupling element 20.1 to 20.4, which in the present case extends longitudinally and has a rectangular cross section, abuts the associated (counterpart) toothing surfaces in a locking manner via its toothing surfaces 2001 and 2002 that are facing away from one another. At that, the axial pre-stress applied via the tension rod 5 supports the meshing of the respective toothing surfaces 601/2001 and 602/2002 of the fastening body 200, on the one hand, and of the associated shaft module 6.1, 6.2, 6.3 or 6.4, on the other.

For (additionally) fixating a coupling element 20.1, 20.2, 20.3 or 20.4 at a holder module 6.1, 6.2, 6.3 or 6.4, each fastening body 200 of a coupling element 20.1 to 20.4 is provided with two oblong holes 2003 that are embodied to be longitudinally extending in the radial direction and arranged opposite each other at two walls of the fastening body 200. An attachment element in the form of a threaded bolt S is passed through the two oblong holes 2003 substantially perpendicular to the longitudinal axis LA. With its head, this threaded bolt S abuts at the attachment section 61 of the respective holding module 6.1 to 6.4, and with its shaft extends through a passage opening 61H in the attachment section 61 as well as further through the opposite oblong holes 2003 of the fastening body 200. A nut is screwed on at an end of the threaded bolt S projecting from the fastening body 200 to additionally apply a holding force perpendicular to the longitudinal axis LA for fixating a coupling element 20.1 to 20.4 in an occupied radial adjusting position.

Consequently, for modifying the radial position of the fork heads 201 of a coupling element 20.1 to 20.4, the axial pre-stress that is applied via the tension rod 5 is reduced by screwing on the nut N at the end of the tension rod 5. What is further facilitated by detaching the nut of the threaded bolt S at the respective holder module 6.1 to 6.4 is an adjustment of the respective fastening body 200 and of the fork head 201 embodied in one piece with the same relative to the carrier body 60 of the holder module 6.1 to 6.4. Here, the different adjusting positions to be occupied, are predetermined by the meshing teeth of the different toothing surfaces 601/2001 and 2002/602.

To be able to adjust the coupling element 20.1-20.4 relative to the respective carrier body 60 as well as radially to the tension rod 5, the fastening body 200 of at each of the toothing surfaces 2001 and 2002 has a radially extending continuous oblong hole 2001H or 2002H through which the tension rod 5 extends.

The embodiment variant of a crank shaft 2 for an adjustment device 3 according to the invention that is shown in FIGS. 1A to 1C, 2A to 2C and 3 is variable in two aspects when it comes to setting a transmission and adjustment track ratio of the individual guide vanes 111 of different guide vane rows 13a to 13c that are to be adjusted by the rotation of the crank shaft 2. On the one hand, the individual shaft modules 6.1 to 6.4, 7A, 7B can be fixated in different rotational positions relative to each other to thus be able to vary the orientation and angular position of the coupling elements 20.1 to 20.4, which are provided at individual holder modules 6.1 to 6.4 and at which the connecting rods 32a, 32b, 32c coupled to the adjusting rings 30a, 30b and 30c are hinged, relative to each other. On the other hand, where necessary, also each coupling element 20.1 to 20.4 including the fork head 201 provided for linking is adjustable in the radial direction with respect to the longitudinal axis LA of the crank shaft 2, and thus the length with which a fork head 201 of a coupling element 20.1 to 20.4 radially projects with respect to the longitudinal axis LA is variable. At the same time, a highly stressable form-fit connection of the individual components of the crank shaft 2 to each other is ensured via the respective fixation by means of one or several toothings in the mounted state of the crank shaft 2 according to the intended use.

Figure 1A:
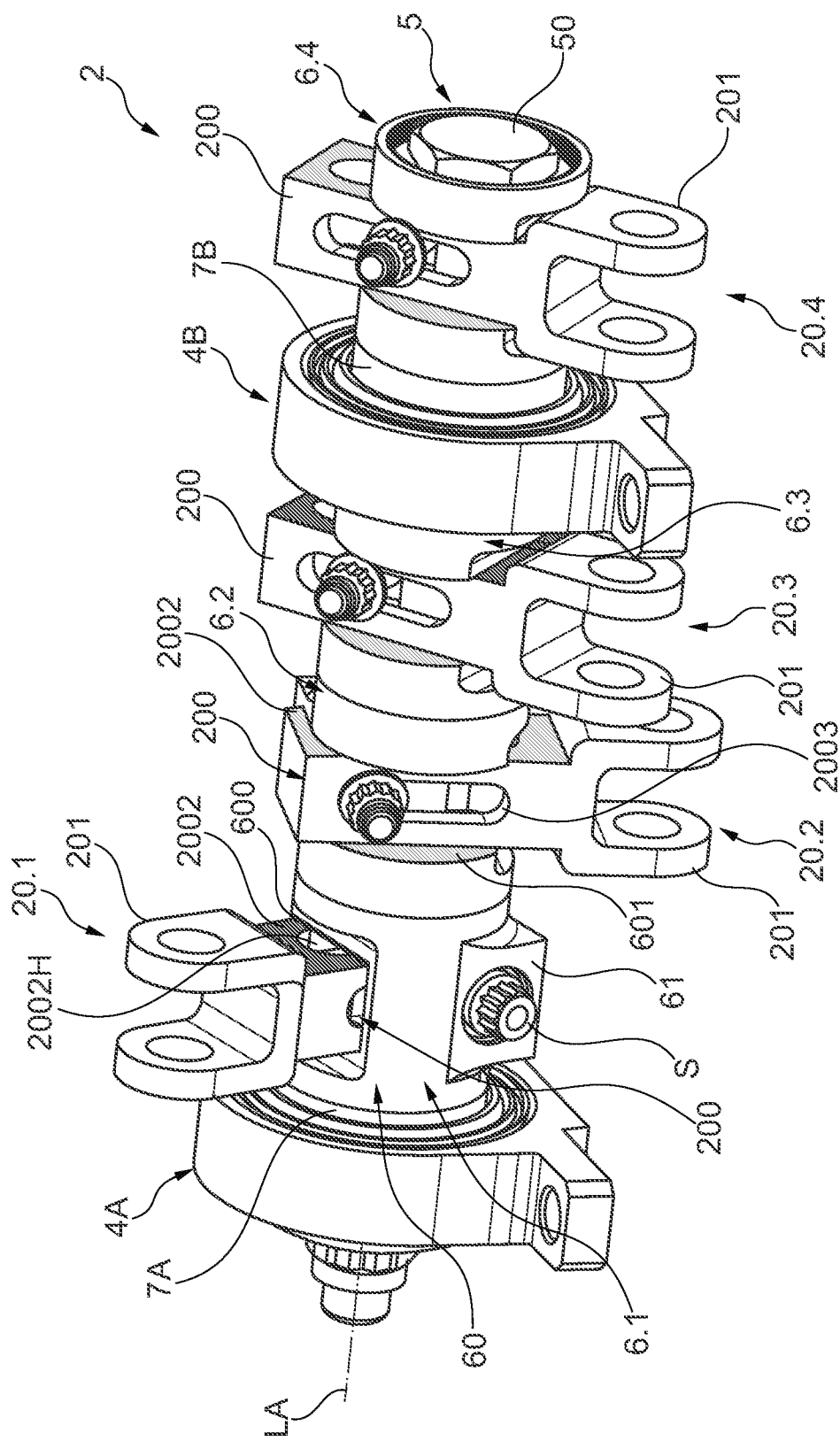
FIGS. 1A-1C show, in different views, a modular crank shaft constructed with several radially adjustable coupling elements of an embodiment variant of an adjustment device for adjusting several guide vanes of an engine according to the invention.
Figure 1B:
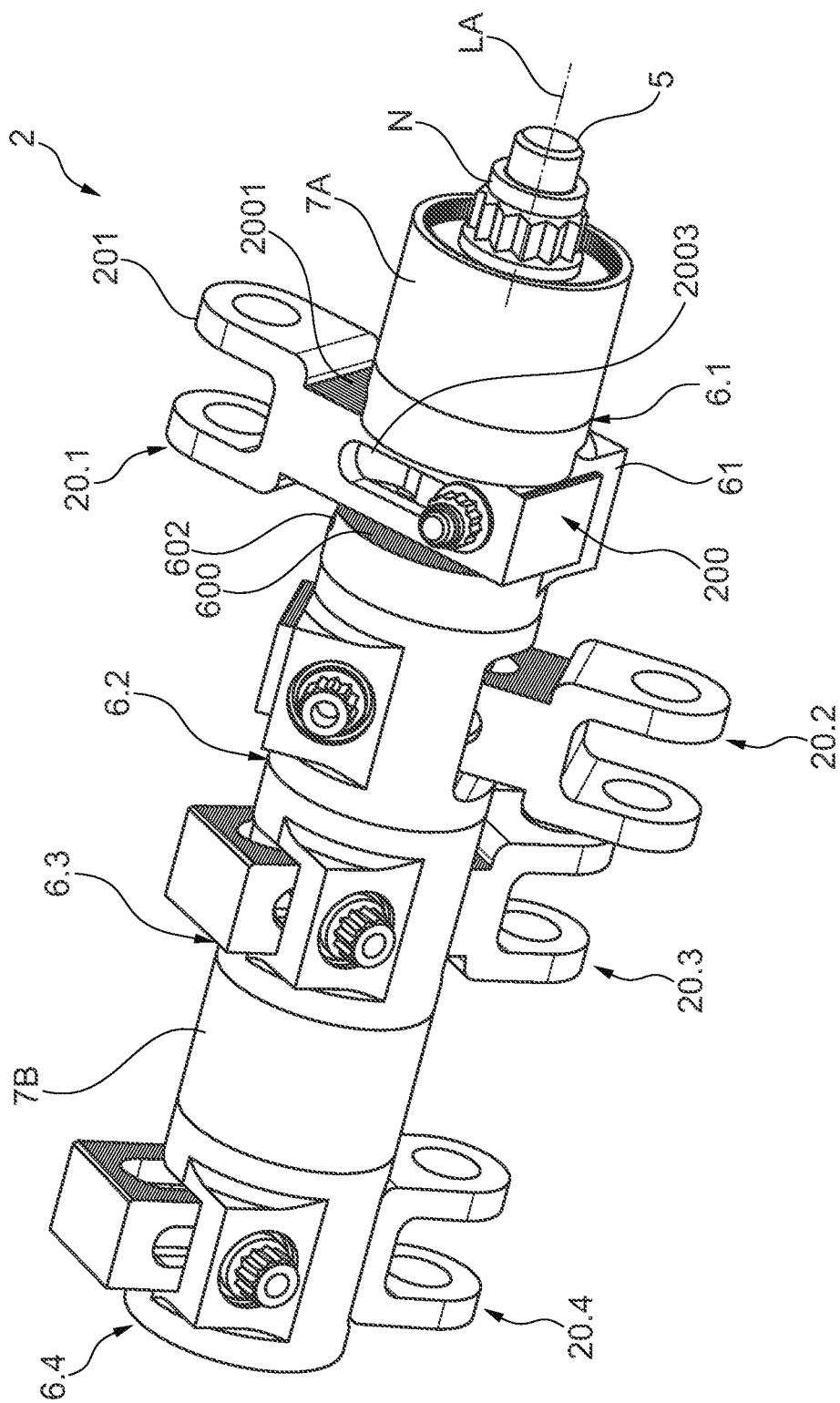
Figure 1C:
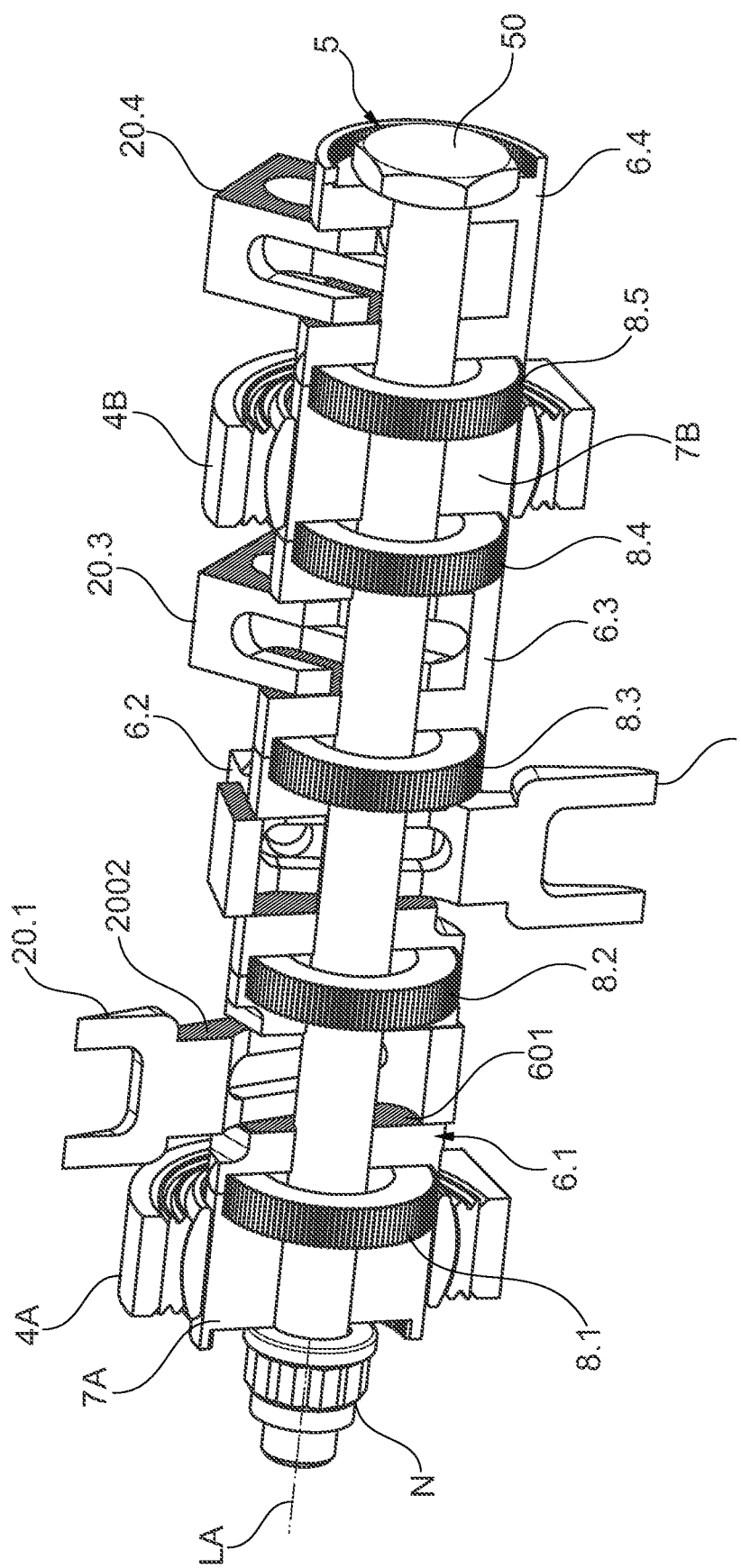
Figure 2A:
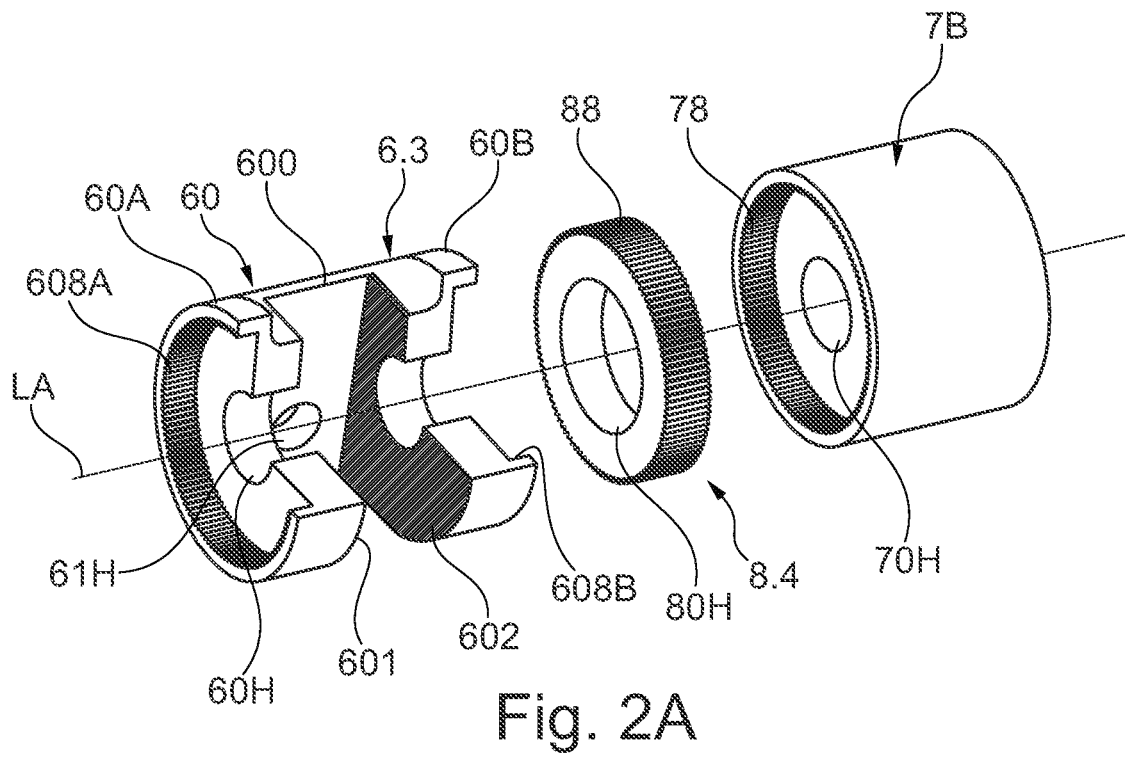
FIGS. 2A-2B show, in an exploded view and in a perspective rendering, two shaft modules of the crank shaft of FIGS. 1A to 1C that are connected to each other in a torque-proof manner in a certain rotational position relative to each other by means of an externally toothed intermediate piece.
Figure 2B:
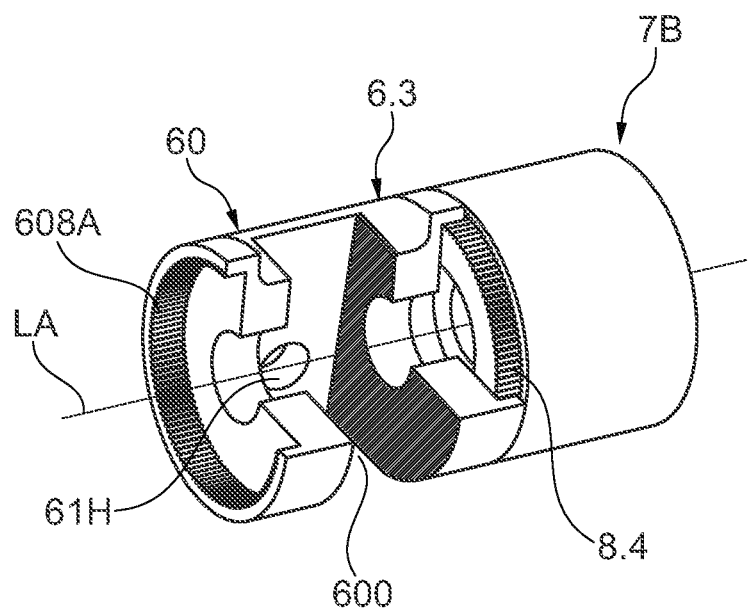
Figure 2C:
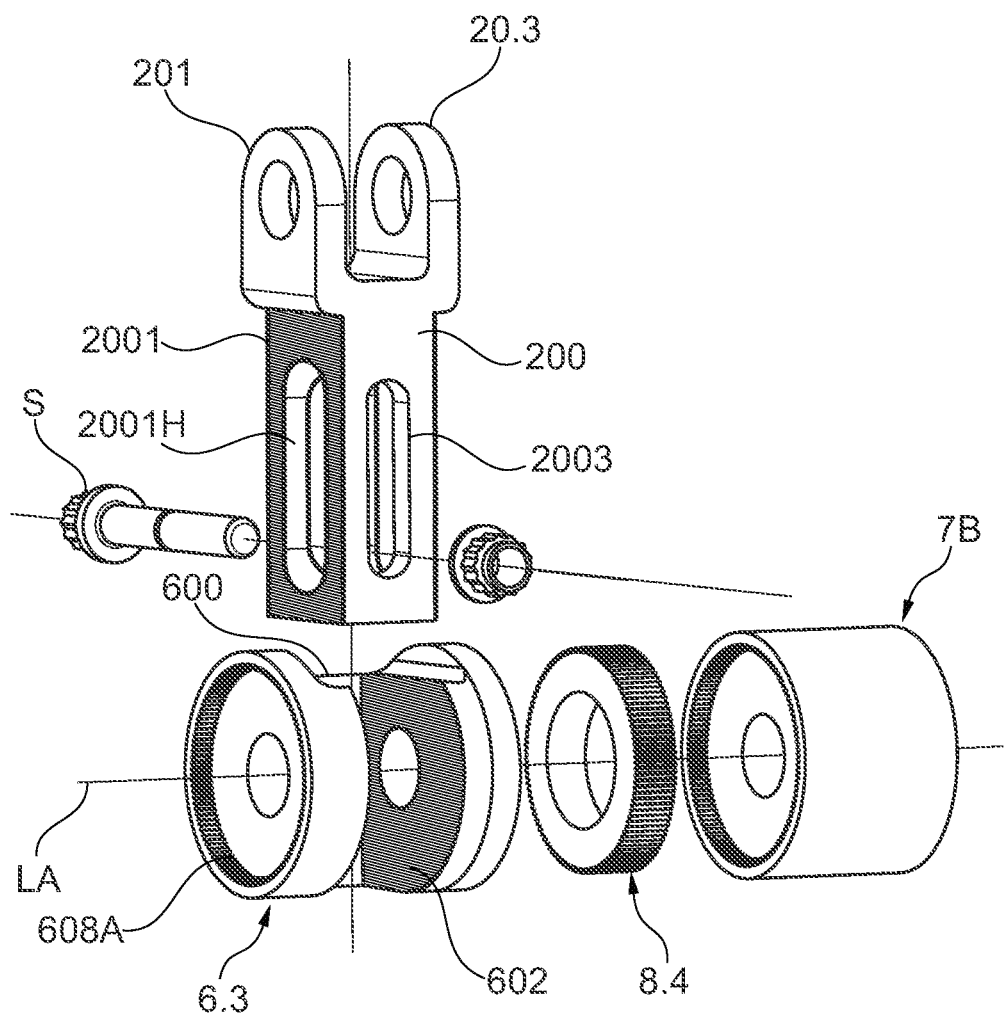
FIG. 2C shows an exploded view of the shaft modules of FIGS. 2A and 2B with a coupling element that has a fork head and that can be fixated at the shaft modules in different radial adjusting positions.
Figure 3:
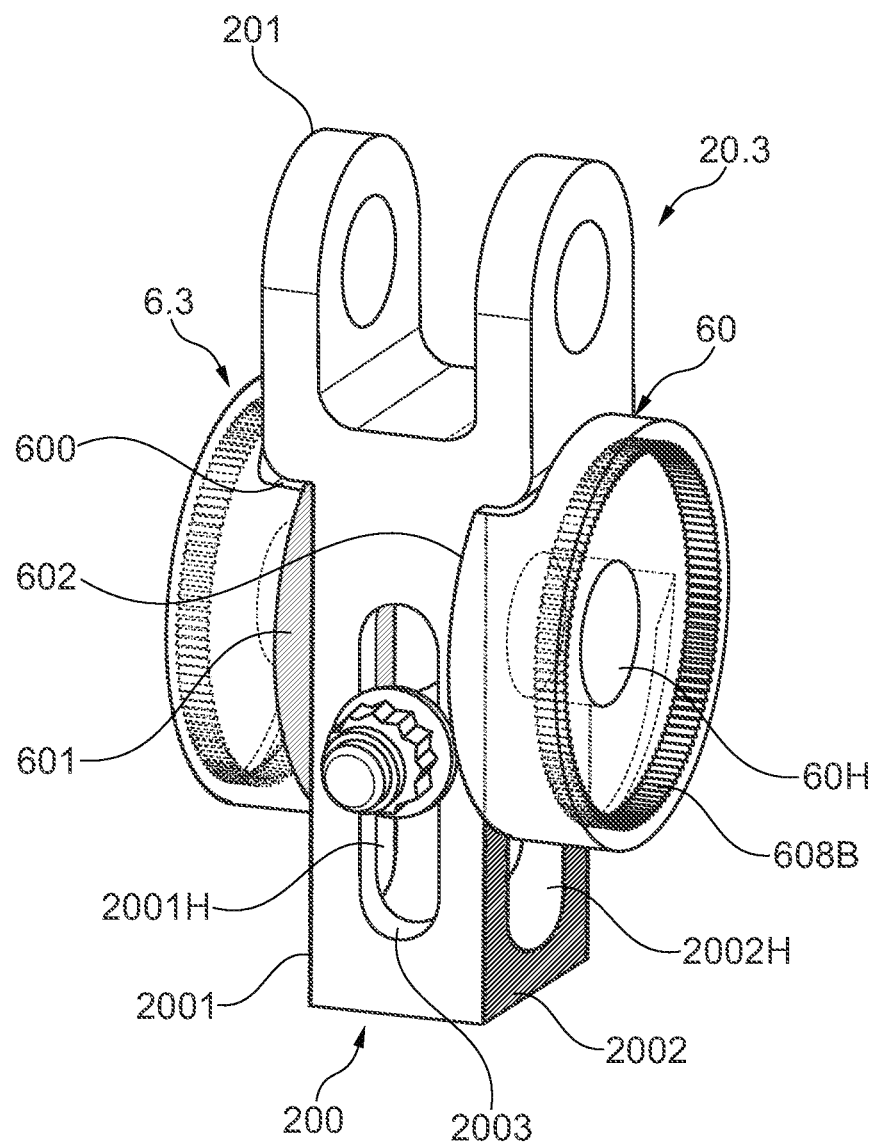
FIG. 3 shows the shaft module with the coupling element in the assembled state.
Figure 4:
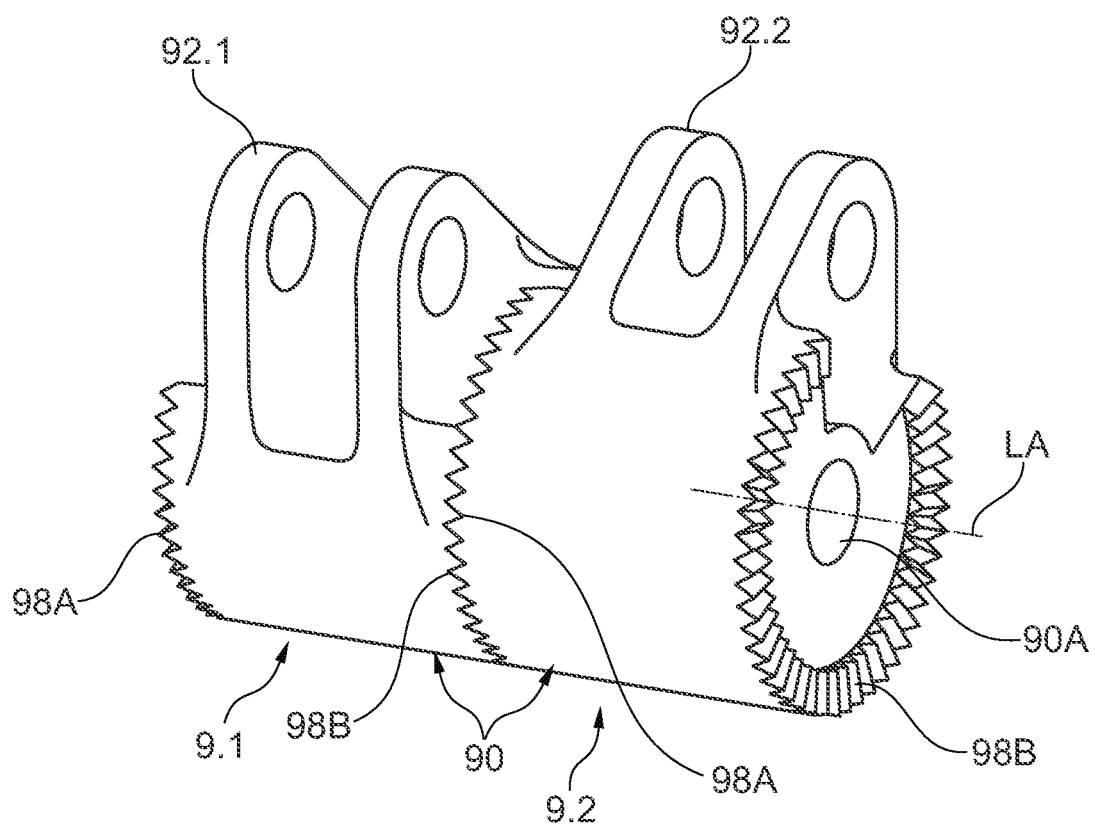
FIG. 4 shows two alternatively embodied shaft modules with coupling elements integrally embodied thereat and fixedly attached in a torque-proof manner at each other by means of a Hirth toothing.

FIG. 4 illustrates a further embodiment variant for the torque-proof, but releasable connection of two shaft modules 9.1, 9.2 of a modular crank shaft 2 for an adjustment device 3 according to the invention. The shaft modules 9.1, 9.2 that are shown here are embodied integrally and thus in one piece with the coupling elements 92.1 and 92.2 at which the linking of the respective connecting rod 30a to 30c occurs. Here, the coupling elements 92.1 and 92.2 respectively project radially from a base body 90 of a shaft module 9.1 or 9.2.

Each shaft module 9.1, 9.2 further has a passage opening 90H for the tension rod 5. In the present case, the axial pre-stress that is applied by the tension rod 5 is also used for securing an alternating form-fit toothing mesh to fixate the two shaft modules 9.1 and 9.2 to each other in a torque-proof manner in the mounted state of the crank shaft 2 according to the intended use. In the present case, a Hirth toothing 98A, 98B is provided. A corresponding annular circumferential toothing surface for the respective Hirth toothing 98A or 98B is embodied at both axial front faces of each shaft module 9.1, 9.2.

PARTS LIST 1 housing
10 bearing extension
11 low-pressure compressor
110 rotor blade
111 guide vane
111a bearing journal
111b journal end
114 shell surface
12 high-pressure compressor
12a-12d rotor blade row
13 high-pressure turbine
13a-13c guide vane row
15 medium-pressure turbine
15 low-pressure turbine
2 crank shaft
20.1-20.4 coupling element
200 fastening body
2001, 2002 toothing surface
2001H, 2002H oblong hole/passage opening
2003 oblong hole/passage opening
201 fork head
3 (guide vane) adjustment device
30a, 30b, 30c adjusting ring (adjusting element)
31 adjustment lever
32a, 32b, 32c connecting rod (connection element)
4A, 4B bearing block
5 tension rod
50 head
6.1-6.4 holder module (shaft module)
60 carrier body
600 recess
601, 602 toothing surface
608A, 608B inner toothing
60A, 60B module section
60H passage opening
61 attachment section
61H passage opening
70H passage opening
78 inner toothing
7A, 7B bearing module (shaft module)
8.1-8.5 gear wheel ring (intermediate piece)
80H passage opening
88 outer toothing
9.1, 9.2 shaft module
90H passage opening
92.1, 92.2 coupling element
98A, 98B Hirth toothing
A outlet
B bypass channel
BK combustion chamber section
D rotational axis/spindle axis
E inlet/intake
F fan
L guide vane assembly
LA longitudinal axis
M central axis/rotational axis
N nut
R entry direction
S threaded bolt (attachment element)

T gas turbine engine
TT turbine
U circumferential direction
V compressor

The invention claimed is:

1. An adjustment device for adjusting several guide vanes of an engine, comprising:
   at least one adjusting element that couples with the guide vanes, wherein the at least one adjusting element is mounted in an adjustable manner;
   at least one connection element that couples with the at least one adjusting element; and
   a crank shaft for controlling an adjusting movement of the at least one adjusting element, wherein the crank shaft further comprises:
      at least one coupling element, wherein the at least one connection element is hinged to the at least one coupling element to transform a rotational movement of the crank shaft about a longitudinal axis of the crank shaft into an adjusting movement of the at least one adjusting element for adjusting the guide vanes; and
      at least two shaft modules axially arranged with respect to one another along the longitudinal axis of the crank shaft, wherein the at least two shaft modules further comprise:
         a first shaft module with a first toothing;
         a second shaft module with a second toothing; and
         wherein the first shaft module and the second shaft module are adjustably fixable in different rotational positions about the longitudinal axis relative to each other via at least one chosen from:
            an arrangement wherein the first toothing and the second toothing form a Hirth toothing and
            an arrangement including an intermediate piece embodied as a gear wheel ring that engages with the first toothing and the second toothing; and
      wherein the at least one coupling element is provided at at least one of the at least two shaft modules.

2. The adjustment device according to claim 1, wherein:
   the at least one adjusting element includes a first adjusting element and a second adjusting element; and
   wherein the at least one connection element includes a first connection element and a second connection element, wherein the second connection element couples with the second adjusting element;
   wherein the at least one coupling element includes a first coupling element and a second coupling element; and
   wherein the second connection element is hinged at the second coupling element at the second shaft module of the crank shaft.

3. The adjustment device according to claim 1, wherein the first shaft module and the second shaft module are adjustably fixable in different rotational positions about the longitudinal axis relative to each other via the intermediate piece that engages with the first toothing and the second toothing.

4. The adjustment device according to claim 3, wherein the intermediate piece has an outer toothing which meshes with the first toothing and the second toothing.

5. The adjustment device according to claim 1, wherein the first shaft module and the second shaft module are adjustably fixable in different rotational positions about the longitudinal axis relative to each other via the arrangement wherein the first toothing and the second toothing form a Hirth toothing.

6. The adjustment device according to claim 1, wherein the at least one coupling element is arranged at one of the at least two shaft modules so as to be radially adjustable between at least two adjusting positions with respect to the longitudinal axis, wherein the at least one coupling element is adjustably fixable in each of the at least two adjusting positions.

7. The adjustment device according to claim 1,
   wherein the at least one coupling element is arranged at the crank shaft so as to be radially adjustable between at least two adjusting positions with respect to the longitudinal axis, wherein the at least one coupling element includes a fastening body with at least one fastening toothing at an axial surface of the fastening body with respect to the longitudinal axis, and wherein the at least one coupling element is adjustably fixable in each of the at least two adjusting positions via the at least one fastening toothing;
   wherein the at least two shaft modules are axially pre-stressed against one another by means of a tension rod that extends along the longitudinal axis; and
   wherein the fastening body includes a radially extending passage opening through which the tension rod extends and via which the fastening body can be radially adjusted with respect to the tension rod when an axial pre-stress of the shaft modules is reduced or removed.

8. The adjustment device according to claim 1, wherein the coupling element has a fork head for coupling to the at least one connection element.

9. An engine with at least one adjustment device according to claim 1.

10. An adjustment device for adjusting guide vanes of an engine, comprising:
    at least one adjusting element that couples with the guide vanes, wherein the at least one adjusting element is mounted in an adjustable manner;
    at least one connection element that couples with the at least one adjusting element; and
    a crank shaft for controlling an adjusting movement of the at least one adjusting element, wherein the crank shaft further comprises:
       at least one coupling element, wherein the at least one connection element is hinged to the at least one coupling element to transform a rotational movement of the crank shaft about a longitudinal axis of the crank shaft into an adjusting movement of the at least one adjusting element for adjusting the guide vanes; and
       wherein the at least one coupling element is arranged at the crank shaft so as to be radially adjustable between at least two adjusting positions with respect to the longitudinal axis;
       wherein the at least one coupling element includes a fastening body with at least one fastening toothing at an axial surface of the fastening body with respect to the longitudinal axis; and
       wherein the at least one coupling element is adjustably fixable in each of the at least two adjusting positions via the at least one fastening toothing.

11. The adjustment device according to claim 10, wherein the at least one fastening toothing includes:
    a first fastening toothing located at a first axial surface of the fastening body;
    a second fastening toothing located at a second axial surface of the fastening body;
    wherein the first axial surface and the second axial surfaces face away from each other.

12. The adjustment device according to claim 10, wherein the fastening body is received at least partially inside a recess, wherein a recess toothing surface is provided at least at one inner wall of the recess, and wherein the recess toothing surface engages with the at least one fastening toothing.

13. The adjustment device according to claim 10, wherein the coupling element has a fork head for coupling to the at least one connection element.

14. An adjustment device for adjusting guide vanes of an engine, comprising:
- at least one adjusting element that couples with the guide vanes, wherein the at least one adjusting element is mounted in an adjustable manner;
- at least one connection element that couples with the at least one adjusting element; and
- a crank shaft for controlling an adjusting movement of the at least one adjusting element, wherein the crank shaft further comprises:
  - at least one coupling element, wherein the at least one connection element is hinged to the at least one coupling element to transform a rotational movement of the crank shaft about a longitudinal axis of the crank shaft into an adjusting movement of the at least one adjusting element for adjusting the guide vanes, and wherein the at least one coupling element includes a fastening body with at least one fastening toothing at an axial surface of the fastening body with respect to the longitudinal axis; and
  - at least two shaft modules axially arranged with respect to one another along the longitudinal axis, wherein the at least two shaft modules is adjustably fixable in different rotational positions about the longitudinal axis relative to each other via at least one toothing connection;
  - wherein the at least one coupling element is provided at at least one of the at least two shaft modules, wherein the at least one coupling element is radially adjustable between at least two adjusting positions with respect to the longitudinal axis, wherein the at least one coupling element is adjustably fixable between the at least two adjusting positions via the at least one fastening toothing; and
- a tension rod extending along the longitudinal axis, wherein the at least two shaft modules are axially pre-stressed against one another via the tension rod, and wherein the fastening body includes a radially extending passage opening through which the tension rod extends and via which the fastening body can be radially adjusted with respect to the tension rod when an axial pre-stress of the at least two shaft modules is reduced or removed.

* * * * *